J. A. BALL.
Attachment for Dredging Machine.
No. 225,205. Patented Mar. 9, 1880.
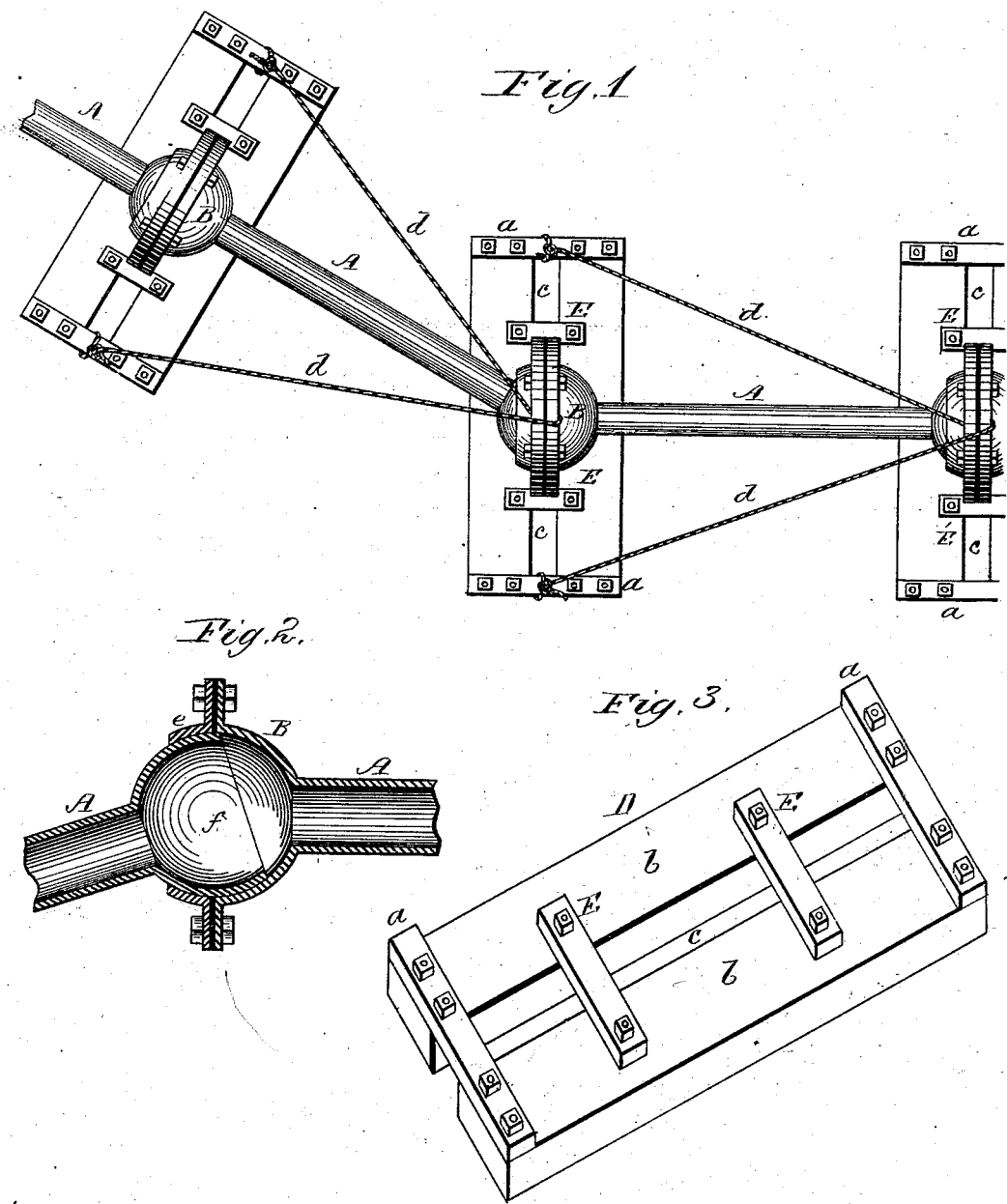

UNITED STATES PATENT OFFICE.

JOHN A. BALL, OF OAKLAND, CALIFORNIA.

ATTACHMENT FOR DREDGING-MACHINES.

SPECIFICATION forming part of Letters Patent No. 225,205, dated March 9, 1880.

Application filed May 12, 1879.

*To all whom it may concern:*

Be it known that I, JOHN A. BALL, of Oakland, in the county of Alameda and State of California, have invented certain new and useful Improvements in Attachments for Dredging-Machines, of which the following is a full, clear, and exact description, reference being had to the accompanying drawings, in which—

Figure 1 is a top-plan view of my invention; Fig. 2, a sectional view of the coupling for the pipes or conductors; Fig. 3, a perspective view of one of the pontons.

The present invention has for its object to provide an attachment for dredging-machines, consisting of a flexible or jointed conduit or pipe to convey the mud or earth, which is mixed with water to render it of such consistency that it may be forced through the conduit or pipe by hydraulic apparatus, in connection with a series of pontons of peculiar construction to hold or support the conduit or pipes, which are connected thereto by ropes or guys to render the pipes self-adjusting to the tides and waves, also to any required angle at which it may be necessary to discharge the earth dredged from the bottom of streams or basins, as will be hereinafter described.

In the accompanying drawings, A represents the pipes or conductors, through which the excavations are designed to be thrown by hydraulic force. The sections of the pipes A are connected together by what is known as the "ball-and-socket" joint, consisting of the hemispherical parts B *f*, the part B being formed with a flange, to which is bolted a circumferential band, *e*, to confine the part *f* within the part B.

The pontons D consist of the timbers *b*, arranged parallel with each other, with a space, *c*, between them to form a socket for the flange of the pipe-joint.

The timbers *b* are held the required distance apart by cross-pieces *a*, bolted to the upper side of the timbers near their ends, and between the cross-pieces *a* are blocks E, also bolted to the timbers *b*, and arranged a suitable distance apart to hold the jointed portion of the pipes A in position.

The pontons D have ropes or chains *d* connected to their ends, and also to the joints of the pipes A, which hold the pontons at right angles to the pipes or joints thereof.

As the joints of the pipes A are rigidly held to the pontons D by the flange of the joint fitting within the space *c* and blocks E holding the joints within the space, one ponton is free to move as the tide or waves vary without influencing any of the others, and as the ropes or guys *d* are attached to the flanges of the joints over the center thereof, they admit of the turning of the pipe and free operation of the joint, while the guys or ropes hold the pontons D at right angles to the pipe.

Having now fully described my invention, what I claim as new, and desire to secure by Letters Patent, is—

The flexible jointed pipes A, in combination with the pontons D, having space *c* and blocks E, the joints of said pipes being connected to the pontons by ropes or guys *d*, substantially as and for the purpose set forth.

JOHN A. BALL.

Witnesses:
JOHN H. REDSTONE,
FRANK R. BRAUN.